No. 800,945. PATENTED OCT. 3, 1905.
W. SCOTT.
OPERATING MECHANISM FOR WATER GATES.
APPLICATION FILED MAR. 24, 1905.

Witnesses
A. L. Hobby
Amelia Williams

Inventor
William Scott
By James Whittemore
atty.

UNITED STATES PATENT OFFICE.

WILLIAM SCOTT, OF DETROIT, MICHIGAN.

OPERATING MECHANISM FOR WATER-GATES.

No. 800,945.   Specification of Letters Patent.   Patented Oct. 3, 1905.

Application filed March 24, 1905. Serial No. 251,719.

*To all whom it may concern:*

Be it known that I, WILLIAM SCOTT, a citizen of the United States, residing at Detroit, in the county of Wayne and State of Michigan, have invented certain new and useful Improvements in Operating Mechanism for Water-Gates, of which the following is a specification, reference being had therein to the accompanying drawings.

The invention relates generally to sluice-gates for controlling the flow of water under pressure; and it consists in the novel and simple construction of operating means therefor and in the peculiar arrangement and combination of the various parts thereof whereby the opening and closing of the gates may be readily effected with a minimum amount of power, as will be more fully hereinafter set forth.

Figure 1:
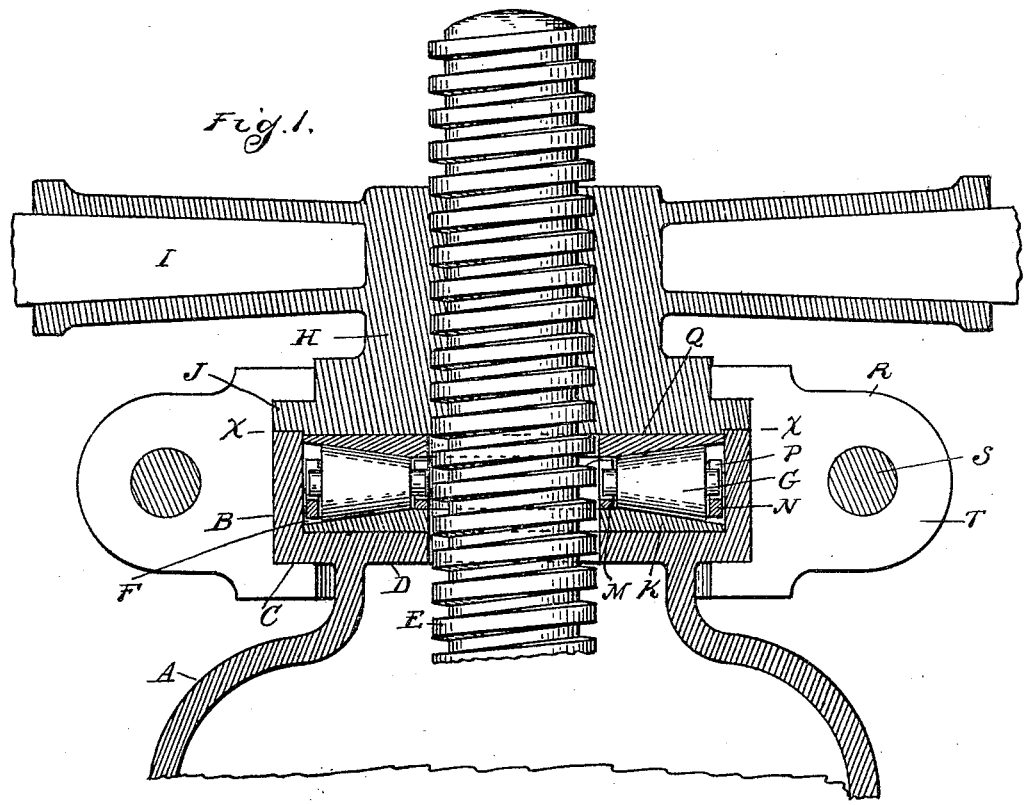
Figure 2:
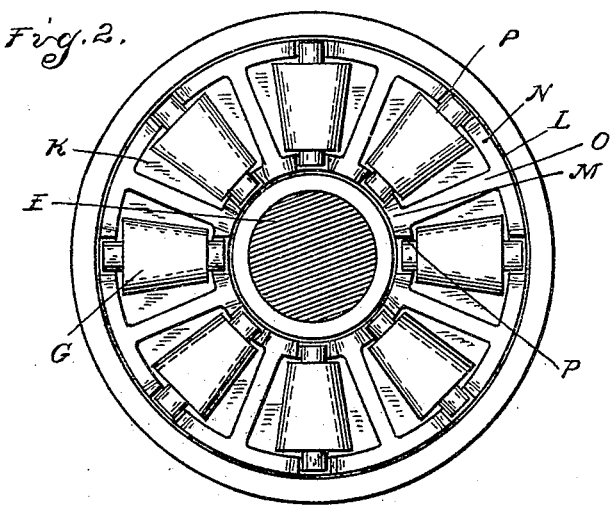

In the drawings illustrating my invention, Figure 1 is a vertical central section through the apparatus, and Fig. 2 is a horizontal section taken on the line $x\,x$ of Fig. 1.

The reference-letter A represents the usual casing of the water-gate. At its upper end the casing terminates in an annular channeled section B, which may be integral with the casing or otherwise connected thereto. This section, as shown, projects laterally beyond the casing, forming an abrupt shoulder C, the purpose of which will be hereinafter set forth, and extends inwardly, as at D, in proximity to the screw-shaft E, which is attached to and adapted to raise and lower the gates.

The channel of the section B (designated by the reference-letter F) constitutes a raceway for an antifriction-bearing, in this instance a series of rollers, as G, and above the bearing and supported thereon is a nut H, engaging the screw-shaft, as shown, and provided, preferably, with a plurality of sockets, in which hand-spikes or capstan-bars I may be inserted for the purpose of rotating the same. It will be understood, however, that other means may be employed for operating the nut, if desired; but the mechanism described is preferable in use. The nut described extends over the vertical portion of the section B and is provided with a shoulder J, corresponding to the shoulder C. Arranged within the channel is an annular wear-plate K, preferably tapered to slope outwardly, as indicated in Fig. 1. Resting upon this plate are the previously-described rollers G, spaced one from another at preferably equal distances by a spacing member L. In construction this member is composed of two separated concentrically-arranged rings M and N, connected by radial arms O, each ring having bearings P formed therein, which are arranged in pairs in alinement, as indicated in Fig. 2. The spacer described is substantially horizontal, the outer ring N being at some distance above the wear-plate K, while the inner ring contacts with the plate, thus reducing the amount of bearing-surface between the parts to a minimum. The rollers are mounted, as indicated, in the several oppositely-arranged pairs of bearings to rest upon the lower plate K out of engagement with the bearings, the entire weight of the roller being supported upon the plate, so that the only friction between the parts will be between the inner ring of the spacer and the plate.

Above the rollers and supported thereon is a tapering annular wear-plate Q, upon which the nut H is supported.

R designates a retaining member, in this instance a two-part ring, for holding the nut upon the antifriction-bearing. The ring is channel-shaped and, as shown, extends over the complementary shoulders J and C upon the nut H and member B of the casing, respectively, and the ring parts are secured together by suitable bolts S, extending through apertured ears T upon the retaining member.

It will be obvious from the description of the device that in the raising and lowering of the screw-shaft to open and close the gate the thrust will be received by the antifriction-bearing on which the nut rests, thus reducing the friction materially between the parts and permitting the operation of the gates to be effected with the use of a minimum amount of power.

What I claim, and desire to secure by Letters Patent, is—

1. The combination with a casing having at its top an annular raceway, of a screw-shaft extending therethrough, a removable wear-plate seated within the raceway, a series of rollers adapted to travel upon the plate, an annular spaced member for said rollers supported upon the wear-plate and having its inner edge only contacting therewith, a nut supported upon the rollers and engaging the screw-shaft, and means for holding said nut against vertical movement.

2. The combination with a casing terminating at its top in an annular channeled section projecting laterally beyond the casing exterior, of a screw-shaft extending centrally through the annular member within the casing, an antifriction-bearing within the channel, a nut supported upon said bearing and engaging the shaft, and a sectional channel-shaped retaining member engaging a shoulder upon the nut and the laterally-projecting portion of the channeled section.

3. The combination with a casing having at its top an annular channeled section, of a screw-shaft extending therethrough, a tapered annular wear-plate seated within said section, a series of tapered rollers adapted to run upon the plate, a spacing member for the rollers comprising connected concentrically-arranged rings, one only contacting with the wear-plate, a tapered plate above and resting upon the rollers, a nut engaging the screw-shaft and supported upon the upper wear-plate, and a retaining-ring engaging the nut and a shoulder upon the channeled section.

In testimony whereof I affix my signature in presence of two witnesses.

WILLIAM SCOTT.

Witnesses:
AMELIA WILLIAMS,
JAS. P. BARRY.